United States Patent
Fang

(10) Patent No.: US 7,591,618 B2
(45) Date of Patent: Sep. 22, 2009

(54) MACHINING METHOD FOR MICRO ABRADERS AND MICRO ABRADERS PRODUCED THEREBY

(75) Inventor: Feng Zhou Fang, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 1009 days.

(21) Appl. No.: 10/789,024

(22) Filed: Feb. 25, 2004

(65) Prior Publication Data

US 2005/0183546 A1   Aug. 25, 2005

(51) Int. Cl.
    *B23C 3/00* (2006.01)
(52) U.S. Cl. .............................. 409/132; 29/558; 604/46
(58) Field of Classification Search ......... 409/131–132, 409/210, 214, 218; 82/1.11; 29/558, 557; 604/46, 176, 272; 451/48, 28, 178
    See application file for complete search history.

(56) References Cited

U.S. PATENT DOCUMENTS

| 5,215,088 | A | * | 6/1993 | Normann et al. ............ 600/377 |
| 5,779,406 | A | * | 7/1998 | Astor ......................... 409/132 |
| 6,132,755 | A | | 10/2000 | Eicher et al. |
| 6,331,266 | B1 | * | 12/2001 | Powell et al. ............... 264/313 |
| 6,406,638 | B1 | * | 6/2002 | Stoeber et al. ............... 216/11 |
| 6,503,231 | B1 | | 1/2003 | Prausnitz et al. |
| 6,899,838 | B2 | * | 5/2005 | Lastovich .................... 264/102 |
| 2002/0045859 | A1 | * | 4/2002 | Gartstein et al. ............ 604/117 |
| 2004/0094503 | A1 | * | 5/2004 | Ozeryansky .................. 216/2 |
| 2005/0171480 | A1 | * | 8/2005 | Mukerjee et al. ............ 604/173 |
| 2008/0138582 | A1 | * | 6/2008 | Bhandari et al. ............ 428/156 |
| 2008/0138583 | A1 | * | 6/2008 | Bhandari et al. ............ 428/156 |

FOREIGN PATENT DOCUMENTS

EP    1 086 719 A1    3/2001
WO    WO-2008/013282 A1 *  1/2008

* cited by examiner

*Primary Examiner*—Erica E Cadugan
(74) *Attorney, Agent, or Firm*—Greenberg Traurig LLP

(57) ABSTRACT

A method for manufacturing microabraders by machining a surface of a workpiece, each of the microabraders having a plurality of sides; for each of the microabraders the method comprising:

(a) making a plurality of cuts into the surface, the plurality of cuts being in a required sequence around the plurality of sides to form a microabrader of a required shape;
(b) the plurality of cuts being of progressively reducing depth such that a final cut is of a smallest depth of all the cuts;
(c) the plurality of cuts, the required sequence and the progressively reducing depth being selected to provide material of the workpiece to support the microabrader until machining is completed.

22 Claims, 4 Drawing Sheets

```
Microabrader of polygonal, triangular, square,
pentagonal, hexagonal, heptagonal, or
octagonal shape
```

MACHINING METHOD FOR MICRO ABRADERS AND MICRO ABRADERS PRODUCED THEREBY

FIELD OF THE INVENTION

This invention relates to a machining method for micro abraders and micro abraders produced thereby.

BACKGROUND OF THE INVENTION

When delivering drugs through the skin (transdermal), various methods and devices have been proposed to enhance permeability of the skin. In one method, microneedles or blades having certain lengths are used to pierce the stratum corneum without passing completely through the epidermis.

In another method for transdermal delivery of drugs, microabraders are used to abrade the stratum corneum of the skin, the microabraders having an array of microneedles with a frustoconical shape, each having a length of about 50 to 250 microns. They also are used to rub against the surface of the skin.

Transdermal drug delivery is also known to use pulsed laser light to ablate the stratum corneum without significant ablation or damage to the underlying epidermis. A drug is then applied to the ablated area and allowed to diffuse through the epidermis.

Other methods of increasing skin permeability include chemical permeation enhances, electrical methods (electroporation), ultrasonic means (sonophoresis), and an electrical field across skin (iontophoresis).

In transdermal drug delivery using microabraders, the required dimensions of microneedles on a microabrader pose significant manufacturing challenges. When machining microabraders, the thin walls of the microneedles are subjected to stresses caused by the cutting tool. This may result in structural failure or damage to the microneedle during a machining operation. Such structural failure or damage is more evident when machining microneedles with higher aspect ratios.

Other methods of manufacturing microneedles include photolithographic etching, which is slow, and does not produce a mirror surface finish.

Furthermore, prior processes result in an unsatisfactory surface finish; an uncontrolled profile of the microabraders; excessively long machining times; and a restricted range of materials are able to be used—mainly silicon. For example, etching requires about 1 minute/μm. For a microabrader 250 μm high, the etching time is 250 minutes.

SUMMARY OF THE INVENTION

In accordance with a preferred aspect of the invention there is provided a method for manufacturing microabraders by machining a surface of a workpiece, each of the microabraders having a plurality of sides, for each of the microabraders the method comprising:
(a) making a plurality of cuts into the surface, the plurality of cuts being in a required sequence around the plurality of sides to form a microabrader of a required shape;
(b) the plurality of cuts being of progressively reducing depth such that a final cut is of a smallest depth of all the cuts.

A first cut may be for a first side of a microabrader and may be of a first depth. A second cut may be for a second side of the microabrader and may be of a second depth. The second depth may be the same as the first depth. Alternatively, it may be different. Preferably, the second side is opposite the first side.

A third cut may be for a third side of the microabrader and may be of a third depth. The third depth may be less than the first depth and the second depth. Alternatively, it may be the same. A fourth cut may be for a fourth side of the microabrader and may be of a fourth depth. The fourth depth may be less than the third depth. Alternatively, it may be the same.

The required shape may be selected from: polygonal, triangular, rectangular, square, pentagonal, hexagonal, heptagonal and octagonal. The workpiece may be rotated between cuts by a required angle to form the required shape.

Each of the plurality of cuts may comprise a plurality of partial cuts, each of the plurality of partial cuts being of progressively reduced depth until the cut is completed. Each of the plurality of cuts, the required sequence and the progressively reducing depth may be selected to provide material of the workpiece to support the microabrader until machining is completed.

In a second preferred aspect there is provided a method for manufacturing microabraders by machining a surface of a workpiece, each of the microabrader to having a plurality of sides, for each of the microabraders the method comprising:
(a) making a plurality of cuts into the surface, the plurality of cuts being in a desired sequence around the plurality of sides to form a microabrader of a required shape;
(b) the plurality of cuts being of progressively reducing depth;
(c) the plurality of cuts, the required sequence and the progressively reducing depth being selected to provide material of the workpiece to support the microabrader until machining is completed.

The workpiece may be rotated between cuts by a required angle to form the required shape.

For both aspects the required sequence may be determined by one or more of: material of the workpiece, a required aspect ratio of the microabrader, and the required shape of the microabraders.

According to a third preferred aspect, there is provided a workpiece with microabraders when produced by the above method.

BRIEF DESCRIPTION OF THE DRAWINGS

In order that the invention may be clearly understood and readily put into practical effect, there shall now be described by way of non-limitative example only preferred embodiments of the present invention, the description being with reference to the accompanying illustrative drawings, in which.

DETAILED DESCRIPTION OF THE PREFERRED EMBODIMENT

Figure 1:
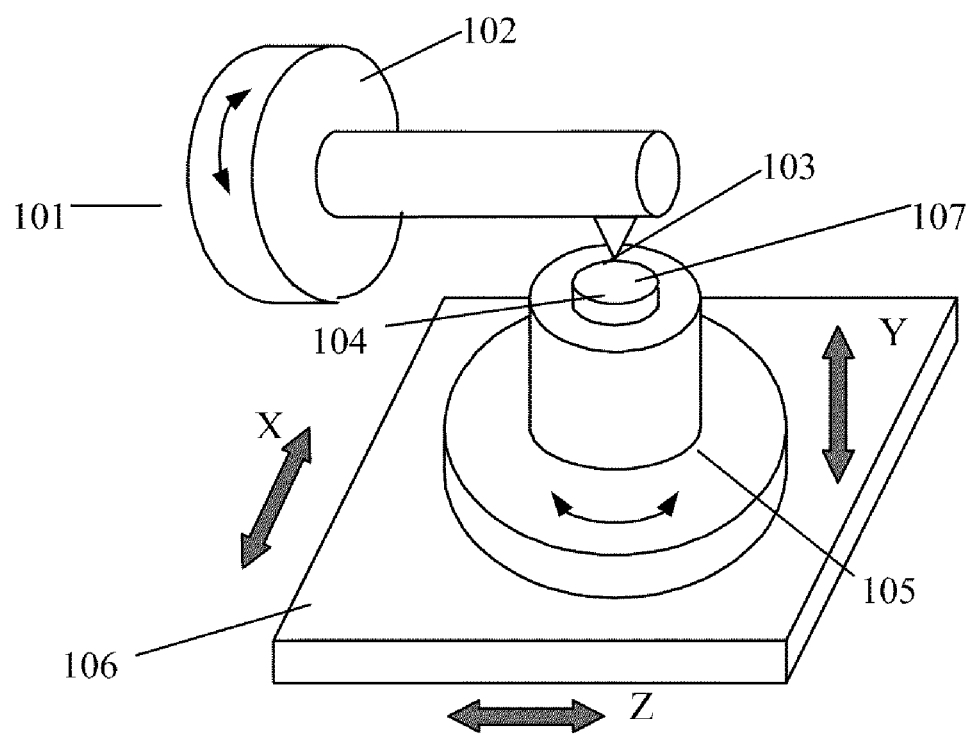
FIG. 1 is a schematic perspective view of a preferred machining set-up.

Throughout the drawings like reference numerals are used for like components with the addition of a prefix number being the number of the drawing figure. To first refer to FIG. 1, there is illustrated the machining set-up of a preferred form. Here, there is a spindle 101 having a shaft 102 extending co-axially therewith and outwardly therefrom. At outer end of shaft 102 is radially mounted a cutting tool 103. Spindle 101, and thus shaft 102 and cutting tool 103, rotates about its longitudinal axis in either rotational direction, as indicated by the arrow.

The cutting tool 103 is for working on a top surface 107 of a workpiece 104. Workpiece 104 is securely and non-moveably (but releasably) attached to a rotary stage 105 able to rotate about its longitudinal axis in both the clockwise and anti-clockwise directions. This is again indicated by an arrow. Rotary stage 105 is securely and non-moveably (but, again, releasably) attached to a slide 106 able to move in three directions: X-horizontally back-and-forth; Y-vertically up-and-down; and Z-horizontally side-to-side.

In this way workpiece 104 can be moved to any required or desired position to enable cutting tool 103 to form microabraders on surface 107.

Preferably, cutting tool 103 is of a size and shape that matches the desired size and shape of the microabraders, such as microabraders 308, 309, 310. In this way, if the cutting tool 103 were to make one cutting pass for each side of a microabrader 310, the microabrader 310 would be of the required size and shape.

Also, by having cutting tool 103 radially mounted on shaft 102 a relatively large cutting radius is created; and shaft 102 can be rotated at a desired or required rotational speed, thus enabling a high cutting speed. The cutting speed may be in the range of from 100 to 1000 meters/minute.

Figure 2:
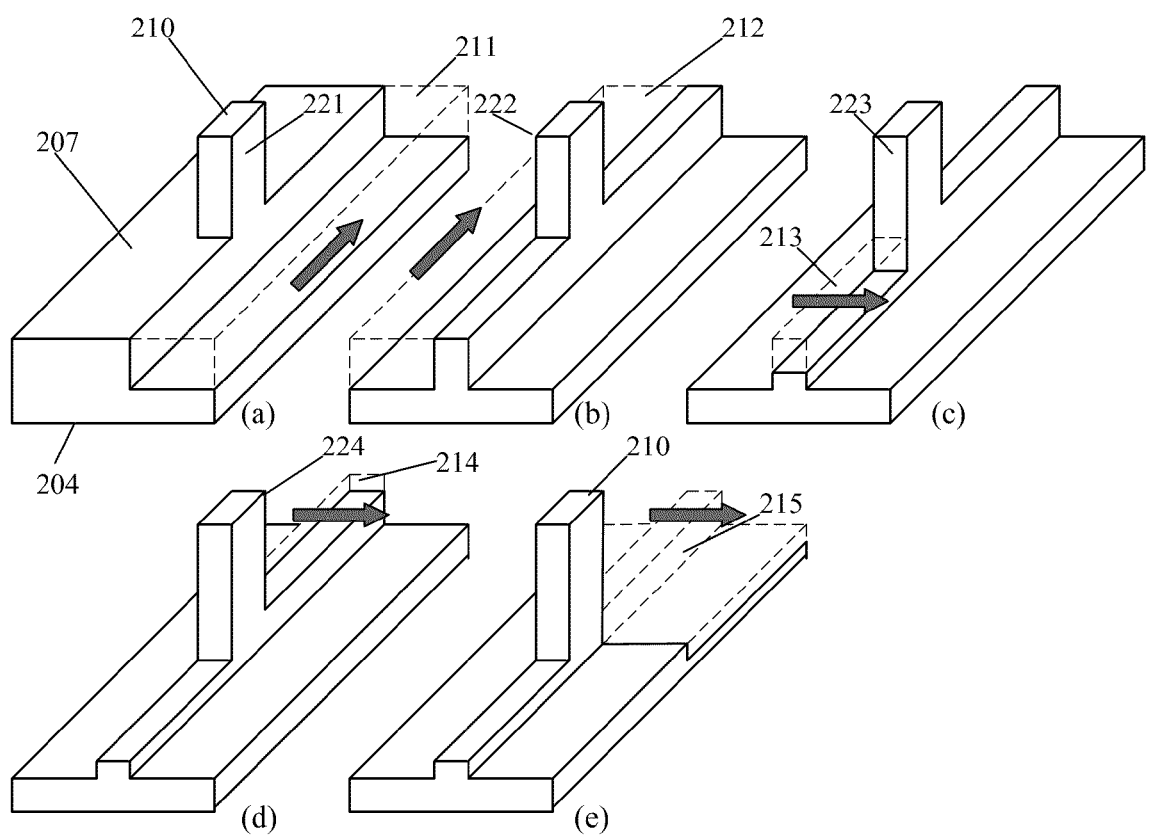
FIG. 2 is a series of illustrations of a preferred embodiment of the method.
Figure 3:
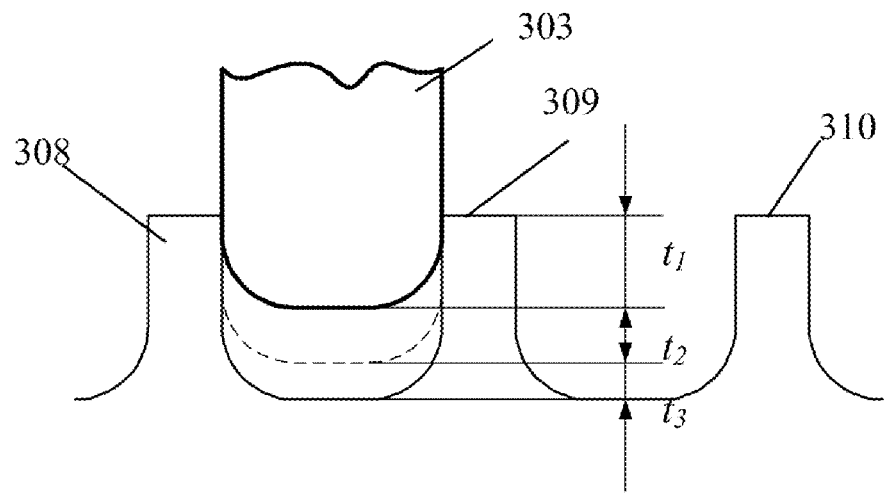
FIG. 3 is a schematic side view of a part of one form of microabrader illustrating in part the method of FIG. 2.
Figure 4:
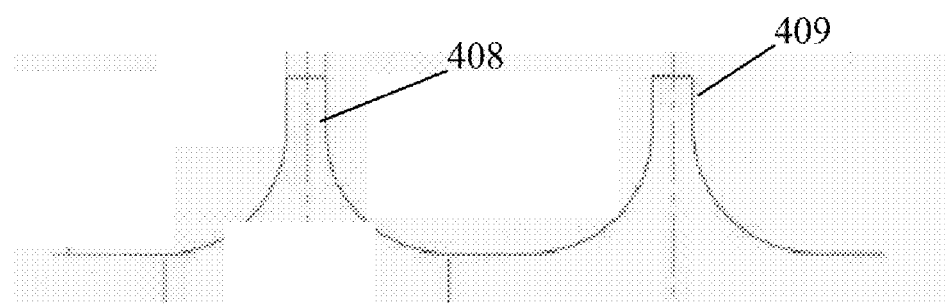
FIG. 4 is a schematic side view of the microabraders of FIG. 3.
Figures 5, 6:
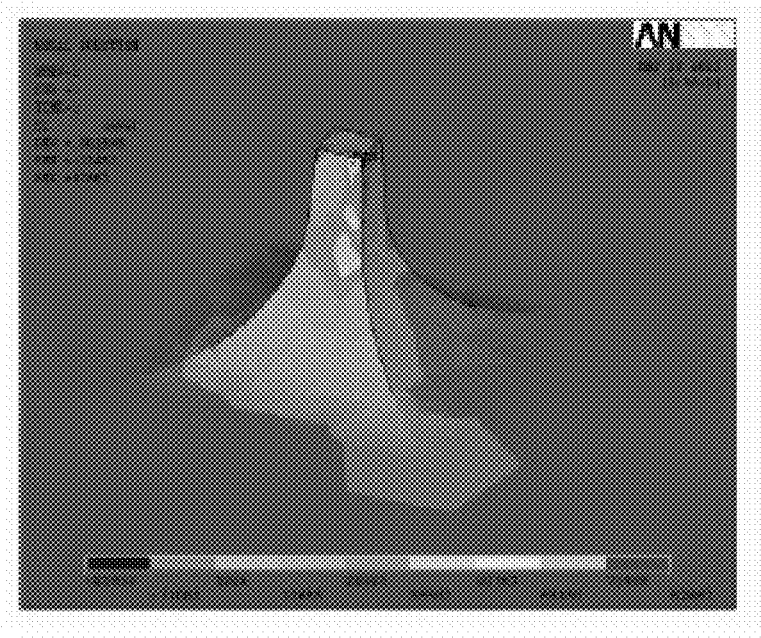
FIG. 5 is a finite element analysis image of a microabrader produced by the method.
FIG. 6 is a schematic illustration of microabraders of various shapes.

Also, as the workpiece 104 can be moved in so many ways and in so many directions, it is possible to machine microabraders of a required or desired shape (when viewed from above) such as, for example, polygonal, triangular, rectangular, square, pentagonal, hexagonal, heptagonal, octagonal, and so forth. The side aspect may be frustoconical as is illustrated in FIGS. 3 and 4, or square as is illustrated in FIG. 2. To vary the top shape, the extent of rotation of rotary stage 105 is varied between cuts.

As is shown in FIGS. 2 and 3, the actual cutting is in accordance with a required, predetermined sequence, with the actual sequence depending on many factors including, but not limited to, the material of workpiece 104, the required aspect ratio of the microabraders, and the required shape of the microabraders 308, 309, 310.

As is shown on FIG. 3, for each cut, a first cut is to a predetermined depth $t_1$. The second cut at that location is for a second depth $t_2$, with $t_2$ being the same as or less than $t_1$. The third cut is for a third depth $t_3$, again $t_3$ being the same as or less than $t_2$. This continues for the required number of cuts until the required depth of cut is achieved. For example, for a depth of cut of 250 µm, the first cut may be 70 µm, the second cut 50 µm, the third cut 30 µm, and so forth, until the required depth of 250 µm is achieved. With each cut, the microabrader becomes more susceptible to damage or deformity due to the stresses induced by the cutting. By progressively reducing the extent of the cut as the depth increases, the likelihood of damage and deformity is reduced.

Furthermore, by adopting a variable layering approach, the risk of damage and deformity may be further reduced. This is illustrated in FIG. 2.

In FIG. 2(a) a first cut 211 of a first depth is made along a first side 221 of microabrader 210. In FIG. 2(b) a second cut 212 of a second depth, is made along a second side 222 of microabrader 210. Second side 222 is preferably opposite first side 221. The second depth is preferably the same as the first depth, as shown, but may be of a different depth to first cut 211 if required or desired.

FIG. 2(c) shows a third cut 213 of a third depth, preferably of a third depth less than the depths of first and second cuts 211 and 212, along a third side of microabrader 210. Alternatively, the depth of the third cut 213 is of the same depth as the first cut 211 and the second cut 212. FIG. 2(d) shows a fourth cut 214, preferably of a fourth depth less than the third depth of third cut 213, and being along a fourth side 224 of microabrader 210. Alternatively, the depth of the fourth cut 214 is of the same depth as the third cut 213.

The fifth cut 215 is illustrated in FIG. 2(d) and is to remove the material remaining after the fourth cut 214 so that after fifth cut 215 the cut depth at the fourth side 224 is the same as the first and second cuts 211, 212 and the first and second sides 221, 222. The final cut (not shown) is to remove the material 225 remaining after the third cut so that cut on the third side 223 is of the same depth as the cuts for the other three sides 221, 222 and 224. Rotation of rotary stage 105 is used to rotate workpiece 104 to enable the cuts 211, 212, 213, 214, 215 and so forth, to be made in the correct order. Movement of the slide 106 enables all microabraders on top surface 107 to be formed, and to control the depth of each cut.

In this way, during the cutting process, the microabrader 210 is supported by un-machined material of workpiece 104 until the final machining is completed. The final machining should be the smallest depth cut. Each cut is preferably a single cut. Alternatively, each cut may be a series of cuts.

Therefore, the depth of cut reduces progressively as machining proceeds, and machining is on different sides of the microabrader 210 to maximize support for microabrader 210 during machining. It will also assist heat dissipation. Finally, a mirror finish may be achieved, as may be a high aspect ratio.

By changing the angle of rotation of the rotary stage 105, the shape of the microabraders can be varied. For example, rotation by 90° between cuts gives a share or rectangular shape to top surface 107; rotation by 120° will give a triangular shape; rotation of 60° will give hexagonal shape; and so forth.

Preferably, the resolution of the rotary stage 105 is of the order of 0.0003°, and the cutting tool 103 may be a single crystal diamond tool. The resolution of slide 106 in the Y and Z directions is preferably 2.5 nm, and 8.5 nm in the Y direction. The material of the workpiece 104 may be a suitable material such as, for example, brass or aluminium.

Whilst there has been described in the foregoing description preferred embodiments of the present invention, it will be understood by those skilled in the technology that many variations or modifications in details of design, construction or operation may be made without departing from the present invention.

The invention claimed is:

1. A method for manufacturing microabraders by machining a surface of a workpiece, each of the microabraders having a plurality of sides, for each of the microabraders the method comprising:
   (a) making a plurality of cuts into the surface, the plurality of cuts being in a required sequence around the plurality of sides to form a microabrader of a required shape;
   (b) the plurality of cuts being of progressively reducing depth of cut such that a final cut is of a smallest depth of cut of all the cuts.

2. A method as claimed in claim 1, wherein a first cut is for a first side of a microabrader and is of a first depth of cut.

3. A method as claimed in claim 2, wherein a second cut is for a second side of the microabrader and is of a second depth of cut.

4. A method as claimed in claim 3, wherein the second cut is on an opposite side of the microabrader than the first cut.

5. A method as claimed in claim 3, wherein the second side is opposite the first side.

6. A method as claimed in claim 3, wherein a third cut is for a third side of the microabrader and is of a third depth of cut.

7. A method as claimed in claim 6, wherein the third cut is transverse to the first cut.

8. A method as claimed in claim 6, wherein the third depth of cut is less than the first depth of cut and the second depth of cut.

9. A method as claimed in claim 6, wherein the third cut is transverse to the second cut.

10. A method as claimed in claim 6, wherein a fourth cut is for a fourth side of the microabrader and is of a fourth depth of cut.

11. A method as claimed in claim 10, wherein the fourth depth of cut is less than the third depth of cut.

12. A method as claimed in claim 10, wherein the fourth cut is on an opposite side of the microabrader than the third cut.

13. A method as claimed in claim 1, wherein the required sequence is determined by one or more selected from the group consisting of: material of the workpiece, a required aspect ratio of the microabrader, and the required shape of the microabraders.

14. A method as claimed in claim 1, wherein the required shape is selected from the group consisting of: polygonal, triangular, rectangular, square, pentagonal, hexagonal, heptagonal and octagonal.

15. A method as claimed in claim 1, wherein the workpiece is rotated between cuts by a required angle to form the required shape.

16. A method as claimed in claim 1, wherein the workpiece is made of brass.

17. A method as claimed in claim 1, wherein the workpiece is made of aluminum.

18. A method as claimed in claim 1, wherein the plurality of cuts, the required sequence and the progressively reducing depths of cut are selected to provide material of the workpiece to support the microabrader until machining is completed.

19. A method for manufacturing microabraders by machining a surface of a workpiece, each of the microabraders having a plurality of sides, for each of the microabraders the method comprising:
   (a) making a plurality of cuts into the surface, the plurality of cuts being in a desired sequence around the plurality of sides to form a microabrader of a required shape;
   (b) the plurality of cuts being of progressively reducing depth of cut;
   (c) the plurality of cuts, the required sequence and the progressively reducing depth of cut being selected to provide material of the workpiece to support the microabrader until machining is completed.

20. A method as claimed in claim 19, wherein the workpiece is rotated between cuts by a required angle to form the required shape.

21. A method as claimed in claim 19, wherein the required sequence is determined by one or more selected from the group consisting of: material of the workpiece, a required aspect ratio of the microabrader, and the required shape of the microabraders.

22. A method as claimed in claim 19, wherein the sequence is determined by one or more selected from the group consisting of: material of the workpiece, a required aspect ratio of the microabrader, and the required shape of the microabraders.

* * * * *